April 9, 1929.   E. J. HORNBERGER   1,708,672
MOTOR DRIVE FOR LATHES
Filed Oct. 17, 1924   3 Sheets-Sheet 1

Inventor
Earl J. Hornberger
By Bates Macklin Goldrick & Paul
Attorney

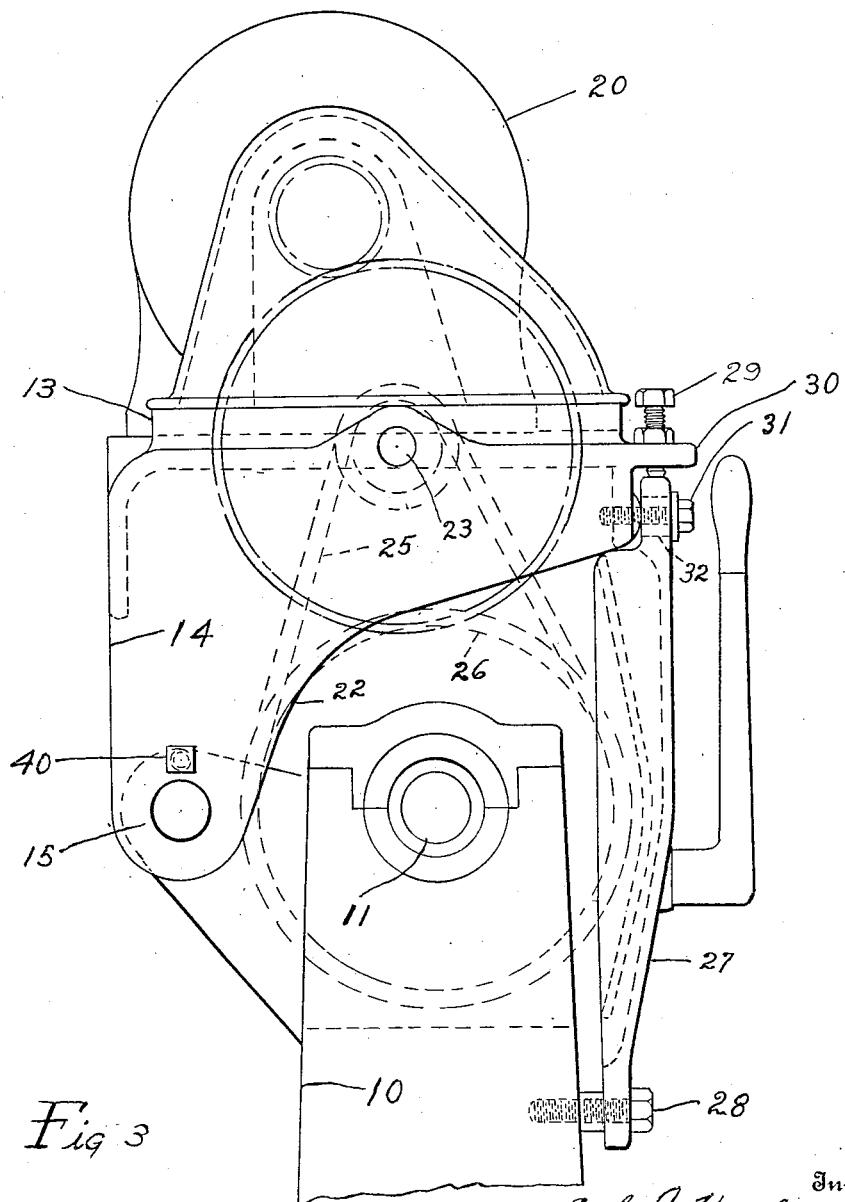

Patented Apr. 9, 1929.

1,708,672

UNITED STATES PATENT OFFICE.

EARL J. HORNBERGER, OF CLEVELAND, OHIO, ASSIGNOR TO BARDONS & OLIVER, A COPARTNERSHIP, OF CLEVELAND, OHIO, CONSISTING OF GEORGE C. BARDONS AND JOHN G. OLIVER.

MOTOR DRIVE FOR LATHES.

Application filed October 17, 1924. Serial No. 744,195.

To convert belt driven machinery, into individual motor driven apparatus, the practice has been to mount a motor either on the floor beneath a machine or upon brackets attached to the machine frame. The principal objection to the use of a motor which is mounted upon the floor is the difficulty of maintaining a satisfactory connection between the armature shaft and the driven member without making extensive changes in the construction of the machine. The usual difficulty of mounting the motor on the side of the frame is the lack of space available between adjacent machines.

To overcome the above mentioned objections, and at the same time to provide means for enabling the belt driven machine to be readily converted into a motor driven machine is the principal object of my invention. In addition my invention is directed toward the provision of means which will permit the driving connection between the motor and driven element to be readily adjusted to compensate for wear, and to facilitate attachment of one size motor to different types of machines.

Figure 1:
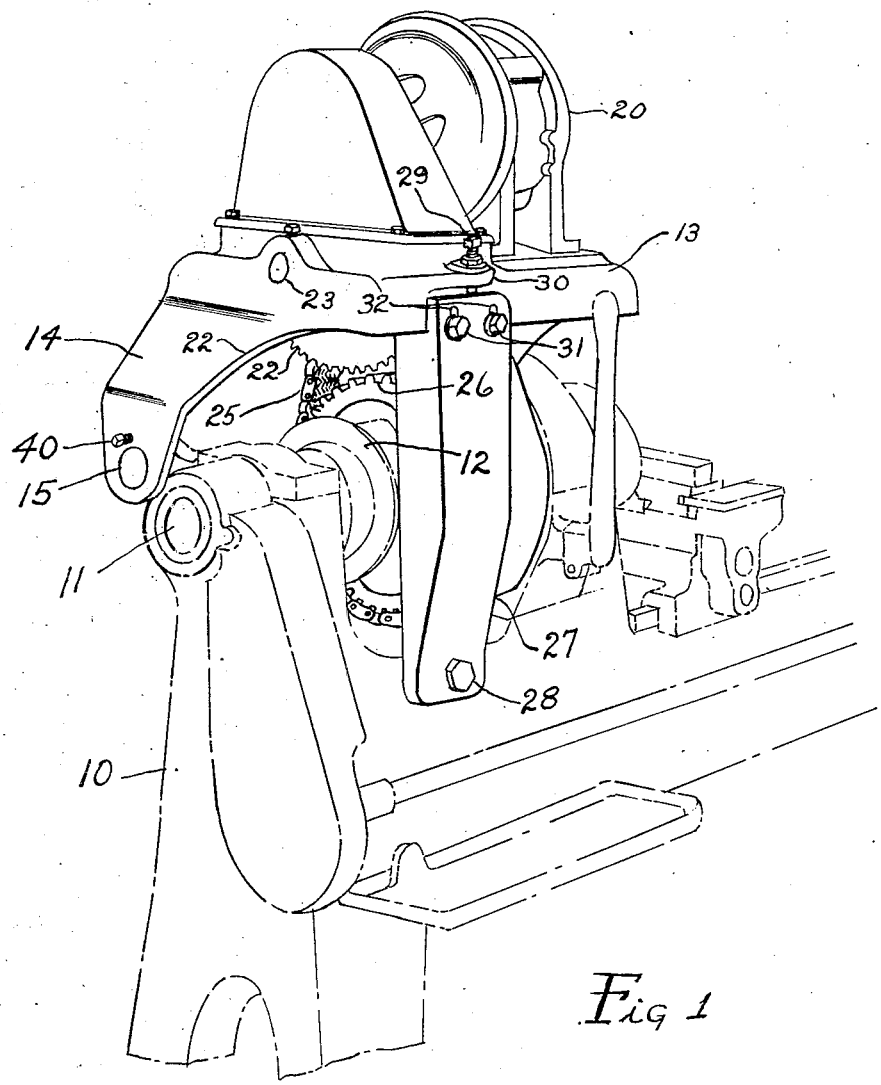
Figure 2:
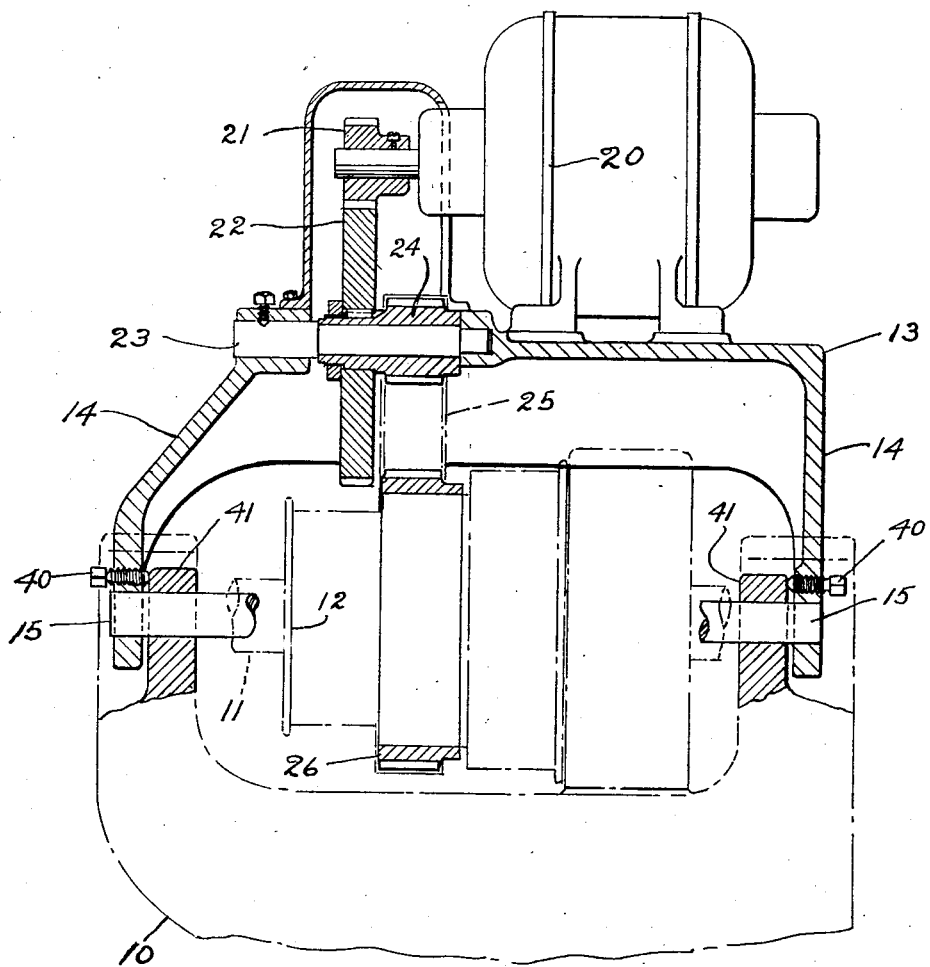

In the drawings, Fig. 1 is a perspective view showing the end of a lathe having my invention attached thereto; Fig. 2 is a vertical section taken through the motor support and operating mechanism actuated by the motor; Fig. 3 is an end view showing a detail of the adjusting mechanism.

I have illustrated my invention in connection with a lathe having a frame 10 which supports a shaft on which cone pulleys 12 are mounted in the usual manner. To drive the shaft 11, I mount the motor above the pulley and provide a positive driving connection between the motor and pulley wheel.

The preferred form of mounting the motor comprises the use of a motor base 13 which has arms 14 extending downwardly adjacent the rearward side of the lathe head. These arms are pivotally mounted at 15 upon an axis extending substantially parallel to the axis of the shaft 11. A motor indicated at 20 is carried by the base 13.

The motor base pivot 15 is mounted in the bearings which usually support what is known as the back gear shaft of a lathe. In existing lathes the practice employed is to stop the ends of the back shaft close to the outer faces of the arms 41. If, therefore, it is desired to utilize the back shaft for supporting the arms 14, then an extension must be added on to the shaft at each end to provide the desired bearing area for the motor base arms. In the drawings, however, I have illustrated a shaft which replaces the back shaft and which projects slightly beyond each arm 41. Thus, in adapting a motor drive to old machines, I can work to finished surfaces without necessitating a planing or a smoothing off of cast surfaces. Moreover, the finished surfaces permit the motor to be lined up quickly and effectively.

To effect a driving connection between the motor and shaft 11, I have shown a pinion 21 on the armature shaft for engaging a gear 22 on a lay shaft 23. The lay shaft in turn may have a pinion 24 the size of which is dependent upon the speed reduction desired between the motor and the driven shaft. In the preferred form, the pinion 24 is connected by a chain belt 25 with a gear 26 which gear is rigidly mounted upon the face of one of the pulleys.

To support the forward end of the motor base, I have illustrated an upright member 27 which is adapted to be attached to the lathe frame by a securing member 28. The upper end of the member 27 is shown as adjustably connected to the motor base as by an adjusting screw 29 which extends through a lug 30 on the base and engages the top of the member 27. To lock the base in adjusted position with reference to the member 27, I may employ threaded members 31 which extend through slots 32 in the upright supporting member and engage the motor base.

To prevent movement of the motor base lengthwise of the lathe, I may employ set screws 40 which extend through the arms of the base and engage bearing blocks 41 in which the member 15 is supported.

My invention is well adapted for attachment to existing machinery, particularly since the motor base can be readily supported upon one side of the driven element while the motor proper and the connecting mechanism can be disposed above the driven element. A further advantage of my invention is the fact that the operating mechanism can be adjusted with reference to the driven element for taking up slack in the chain belt. The pivotal mounting of the motor base combined with the vertical adjustment permits the use of any one unit upon different sizes of lathes thus obviating the necessity for special equipment for each particular installation. By utilizing a positive driving connection between the motor and driven element, then the speed of the driven element may be adequately controlled by employing a variable speed motor.

Having thus described my invention, I claim:

In combination, a lathe frame having a head spindle and back shaft bearings, of means mounted in said bearings and projecting therebeyond, a base disposed above the head spindle and having depending arms pivotally mounted on the projecting portions of said means, an electric motor carried by the base, driving connections between the motor and the head spindle, said pivotal projecting portions being longer than the width of the arms whereby the motor base may be adjusted in a direction extending axially of the head spindle, and means associated with the front of the frame for enabling the motor base to be swung about said pivotal connection.

In testimony whereof, I hereunto affix my signature.

EARL J. HORNBERGER.